S. M. COLE.
TRAP.
APPLICATION FILED NOV. 19, 1908.
937,360.
Patented Oct. 19, 1909.
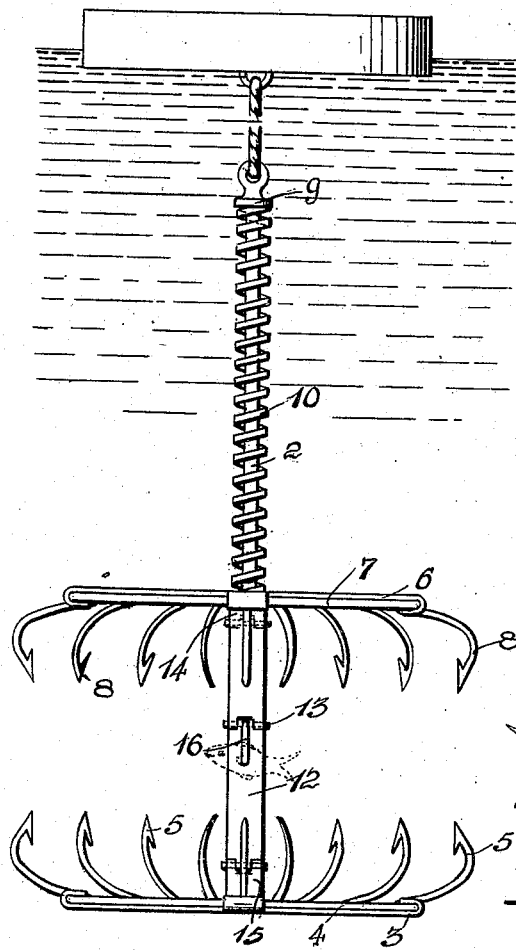
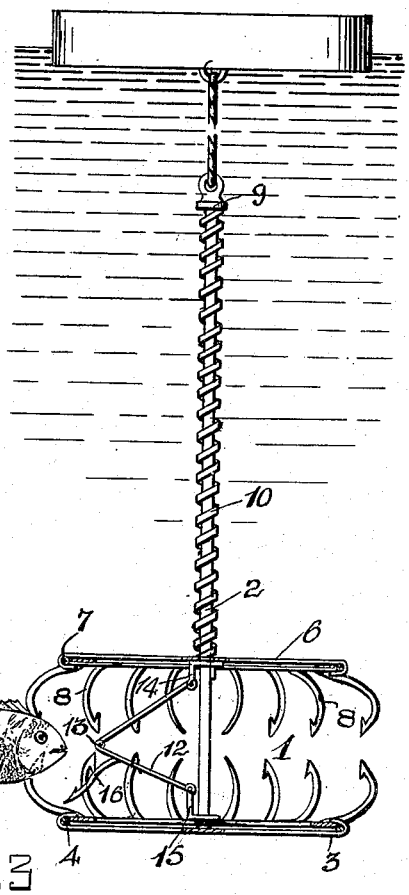
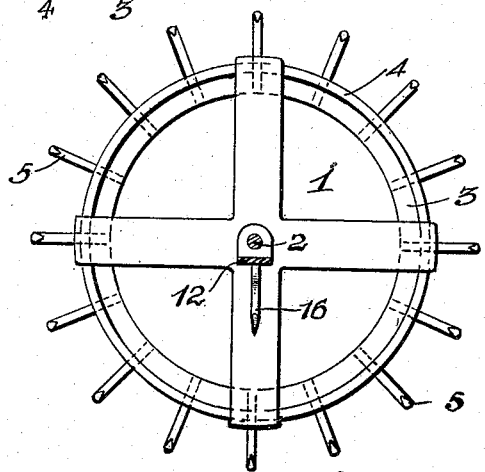
Witnesses
Ernest Crocker
C. H. Griesbauer
Inventor
S. M. Cole
By H. B. Willson & Co.
Attorneys

UNITED STATES PATENT OFFICE.

SAMUEL M. COLE, OF CHICKASHA, OKLAHOMA.

TRAP.

937,360. Specification of Letters Patent. Patented Oct. 19, 1909.

Application filed November 19, 1908. Serial No. 463,467.

*To all whom it may concern:*

Be it known that I, SAMUEL M. COLE, a citizen of the United States, residing at Chickasha, in the county of Grady and State of Oklahoma, have invented certain new and useful Improvements in Traps; and I do declare the following to be a full, clear, and exact description of the invention, such as will enable others skilled in the art to which it appertains to make and use the same.

This invention relates to improvements in impalement traps.

The object of the invention is to provide a trap of this character especially designed for the purpose of catching fish, but which may be successfully employed for catching small game and animals.

A further object is to provide an impalement trap having circular jaws provided around their entire circumference with impaling pins, whereby when the trap is sprung, the fish or animal will be caught in an attempt to retreat in any direction.

A trap constructed in this manner may also be approached and entered from any direction.

With these and other objects in view, the invention consists of certain novel features of construction, combination and arrangement of parts as will be described and particularly pointed out in the appended claim.

In the accompanying drawing, Figure 1 is a side view of the trap, showing the jaws in open or set position and the arrangement of the float for supporting the trap in the water; Fig. 2 is a side view showing the trap sprung and the jaws closed upon a fish; and Fig. 3 is a horizontal sectional view taken above the bait-holding hook or trigger.

Referring more particularly to the drawings, 1 denotes the trap, which consists of a centrally disposed supporting rod, or standard, 2, on the lower end of which is fixedly mounted a lower jaw, 3, which preferably consists of an open circular frame, 4, around the outer edge of which is secured a series of radially-projecting, upwardly-curved barbed impaling hooks, 5.

Slidably mounted on the rod, 2, is an upper movable jaw, 6, said jaw consisting of an open circular frame, 7, which corresponds to the lower frame, 4, and has secured thereto a series of radially-projecting, downwardly curved barbed impaling hooks, 8. On the rod, or standard, 2, is formed a stop, 9, between which and the outer side of the upper jaw, 6, is arranged a coiled spring, 10, the tendency of which is to forcibly close the upper jaw upon the lower jaw. The upper jaw is held in an open position above the lower jaw by means of a trigger bar, 12, said bar being formed in two sections, which are hingedly connected together at their inner ends as shown at 13. The outer end of the upper section of the bar is hingedly connected to a depending lug, 14, on the inner side of the upper jaw, while the lower or outer end of the lower section of the bar is hingedly connected to an upwardly projecting lug, 15, on the inner side of the lower jaw. When the sections of the trigger bar, 12, are opened out to a vertical position, the upper jaw will be held in an operative or set position above the lower jaw. Connected to the lower section of the trigger bar, adjacent to its upper end, is a bait-holding hook or trigger, 16, upon which a suitable bait is placed so that when the fish or animal enters the trap and pulls upon the bait and trigger, the sections of the trigger bar will be drawn outwardly where they are hingedly connected together, thus permitting the spring, 10, to forcibly close the upper jaw, thus catching the fish or animal and impaling it between the impaling hooks of the upper and lower jaws.

When the trap is employed for catching fish, it is let down into the water to the desired distance and is preferably supported in this position by means of a suitable float, 17, to which it is suitably connected, as shown in Fig. 1 of the drawings. It will be noted owing to the circular construction of the trap the same may be approached from any direction and by arranging the impaling hooks or pins to project radially around the entire circumference of the jaws, that the animal will be caught no matter in which direction it attempts to retreat after the trap has been sprung.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

A trap of the class described comprising a centrally-disposed supporting rod, a lower jaw in the form of an open circular frame provided at its edge with a series of impaling hooks fixedly mounted on the lower end of said rod, a similar upper jaw provided with a series of impaling hooks slidably mounted on said rod above the lower jaw, a spring around the supporting rod adapted to forcibly close the upper jaw upon the lower jaw, a trigger bar to hold the upper jaw in elevated or set position, said trigger bar comprising upper and lower sections having their inner ends connected and their outer ends hinged to the centers of the upper and lower jaws respectively, the trigger bar sections being normally held in set position by the pressure of said spring, a bait hook projecting from the lower section of the trigger bar and a float to support the trap in the water.

In testimony whereof I have hereunto set my hand in presence of two subscribing witnesses.

SAMUEL M. COLE.

Witnesses:
F. S. DARBY,
S. S. SCOTT.